United States Patent [19]

Harrison et al.

[11] 4,198,081

[45] * Apr. 15, 1980

[54] HEAT RECOVERABLE METALLIC COUPLING

[75] Inventors: John D. Harrison, Palo Alto; James E. Jervis, Menlo Park, both of Calif.

[73] Assignee: Raychem Corporation, Menlo Park, Calif.

[*] Notice: The portion of the term of this patent subsequent to Jul. 12, 1994, has been disclaimed.

[21] Appl. No.: 800,892

[22] Filed: May 26, 1977

Related U.S. Application Data

[63] Continuation of Ser. No. 410,314, Oct. 29, 1973, Pat. No. 4,035,077, which is a continuation of Ser. No. 51,809, Jul. 2, 1970, abandoned, which is a continuation-in-part of Ser. No. 852,722, Aug. 25, 1969, abandoned.

[51] Int. Cl.² ............................................. F16L 25/00
[52] U.S. Cl. ................................. 285/381; 29/447; 75/170; 285/417; 285/422
[58] Field of Search .............. 285/381, 422, 187, 21, 285/417, DIG. 17, 364; 75/170, 175.5; 29/447, 417; 148/11.5 R, 13 R

[56] References Cited

U.S. PATENT DOCUMENTS

| | | | |
|---|---|---|---|
| 2,992,021 | 7/1961 | Nay | 285/381 X |
| 3,012,882 | 12/1961 | Mulhower et al. | 75/151 X |
| 3,139,468 | 6/1964 | Wheat | 285/381 X |
| 3,174,851 | 3/1965 | Buehler | 148/13 R |
| 3,351,463 | 11/1967 | Rozner et al. | 75/110 |
| 3,498,640 | 3/1970 | Hallesy | 285/417 X |
| 3,513,429 | 5/1970 | Helsop | 285/381 X |
| 3,558,369 | 1/1971 | Wang et al. | 75/175.5 |
| 3,579,805 | 5/1971 | Kast | 285/381 |
| 3,622,941 | 11/1971 | Wetmore | 339/98 |
| 4,035,007 | 7/1977 | Harrison et al. | 285/381 |

OTHER PUBLICATIONS

Wang, F. E. et al., *A Summary of Recent Research on the Nitinol Alloys and Their Potential Application in Ocean Engineering*, 1968.
Ibers, J. A., *Crystallography*, Physics Today 18(i), p. 36, Jun. 1965.
Wiley, R. C. et al., *Effects of Low Temp.—TiNi*, Journal of Applied Physics 34(5), pp. 1475-1477, 5/1963.
*Cryofit Pamphlet*, Raychem Corporation, 1979.

*Primary Examiner*—Dave W. Arola
*Attorney, Agent, or Firm*—Lyon & Lyon

[57] ABSTRACT

A coupling for tubes, pipes or the like, fabricated of heat recoverable metal that is treated so that it will contract when heated above its transition temperature spontaneously expand when cooled to its transition temperature to permit it to be installed or removed from the pipes.

8 Claims, 8 Drawing Figures

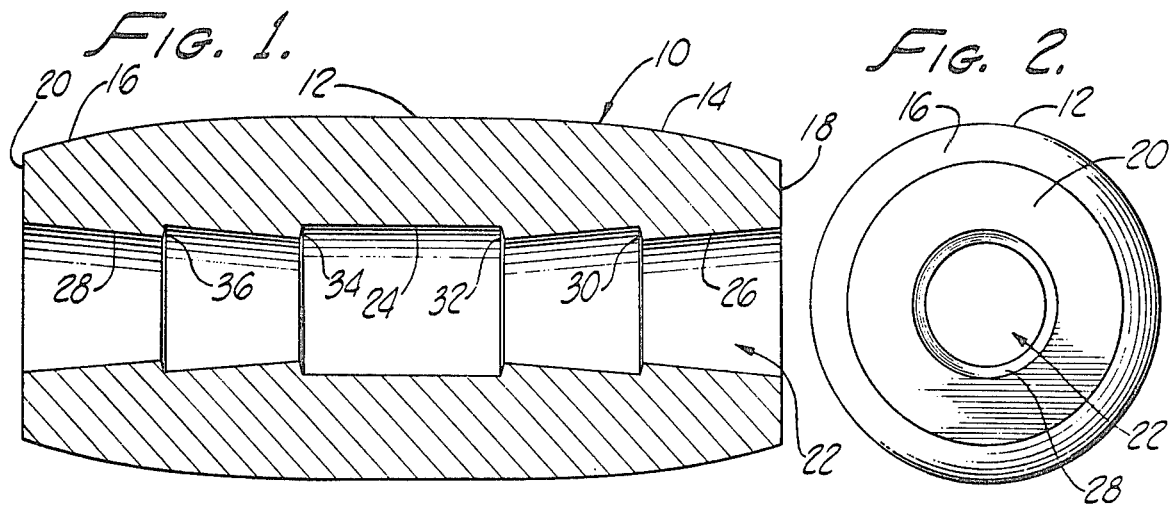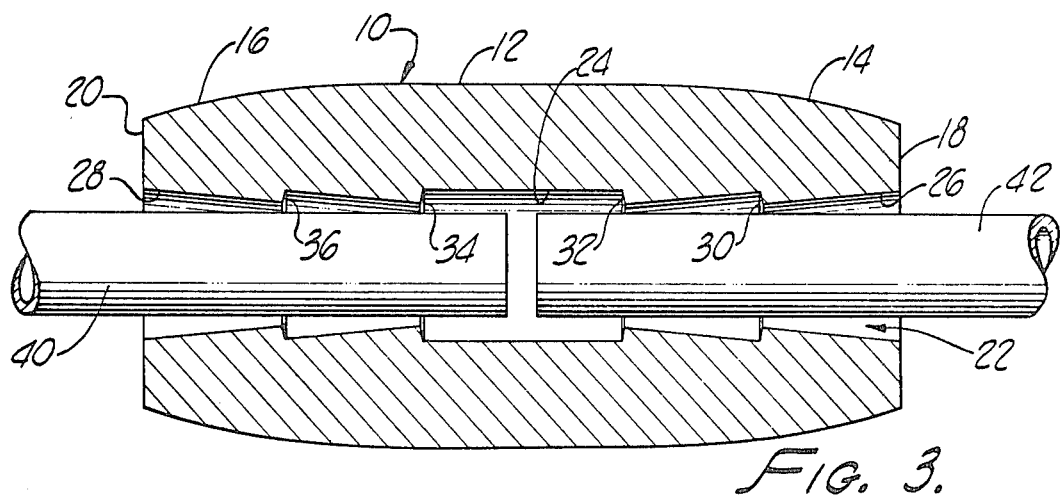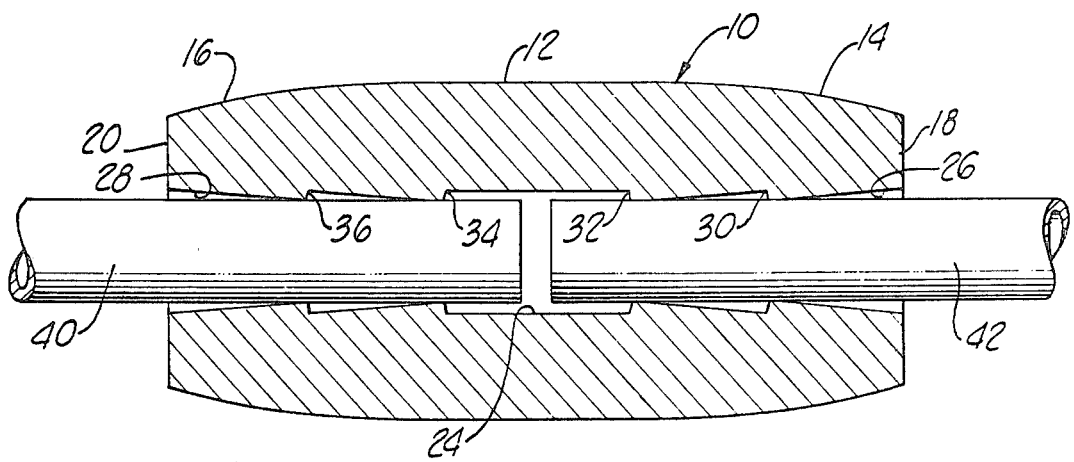

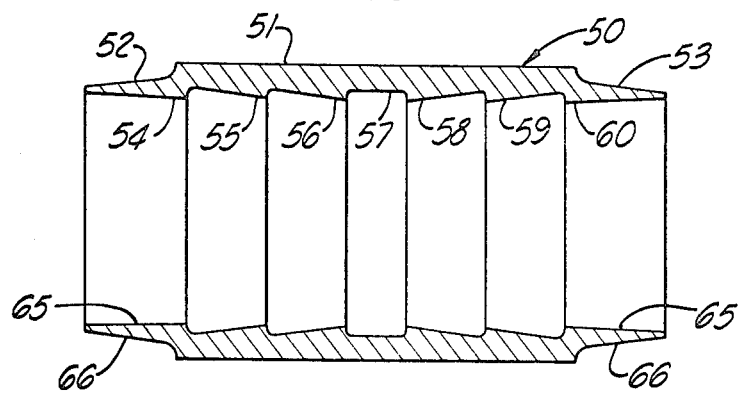
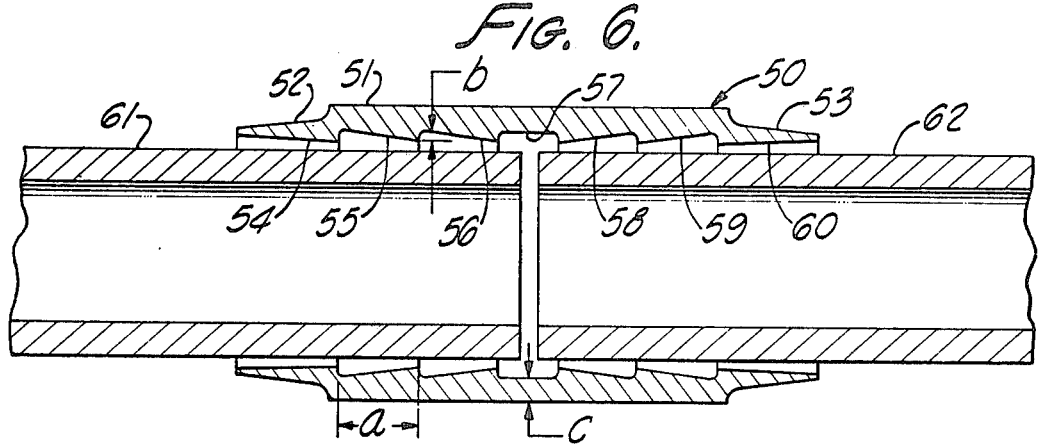
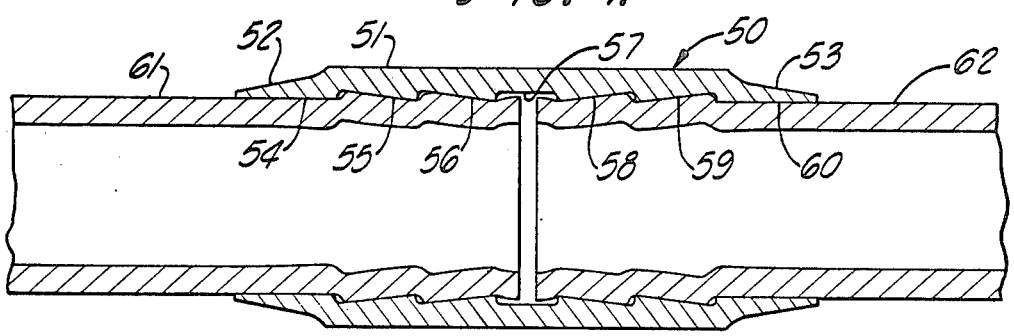
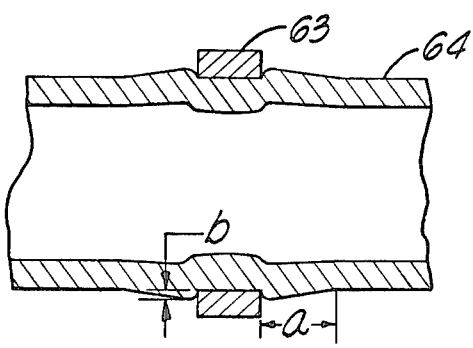

HEAT RECOVERABLE METALLIC COUPLING

CROSS REFERENCE TO RELATED APPLICATIONS

This is a continuation of Application Ser. No. 410,314, filed Oct. 29, 1973 (now U.S. Pat. No. 4,035,077), which is a continuation of Ser. No. 51,809, filed July 2, 1970, now abandoned, which is a continuation-in-part of Ser. No. 852,722, filed on Aug. 25, 1969, and now abandoned.

BACKGROUND OF THE INVENTION

This invention relates to pipe couplings and similar fittings and to processes for their manufacture and application.

Considerable effort has been expended over many years to provide simple and reliable means for joining the abutting ends of pipes and conduits. Whatever method is used should not interfere substantially with the material in the pipe, nor should flow be restricted to any significant extent. The joint between the two pipes should be capable of withstanding any mechanical or chemical misuse that the pipes themselves can withstand, without being too expensive or difficult to install, repair or replace.

With the great use of pipes in aerospace applications, for example in aircraft hydraulic lines, additional requirements of light weight and, in some cases, small size have to be met. Also, as aircraft are frequently taken apart for servicing, the connections to hydraulic equipment to various components have to be broken and remade in the aircraft, often in confined conditions. These requirements militate against the use of welded or brazed connections which would otherwise appear to be an obvious method of overcoming the problem. Welding or brazing, however, requires bulky equipment which must completely surround the pipes to be joined and a welded joint cannot readily be taken apart and remade.

SUMMARY OF THE INVENTION

It is an object of the present invention to provide a coupling which can be rapidly and reliably applied to or removed from pipes to be joined, or other objects, together with the method of using the same.

According to the present invention, there is provided a coupling for objects such as tubes, pipes or the like which provides a reliable and leak-proof junction and which can be easily transported to its place of use and quickly applied or removed without the use of bulky or complex equipment and by people of relatively little skill. These objectives are achieved by fabricating the coupling from a heat recoverable metallic material which can be made to expand spontaneously temporarily prior to its application to, or removal from, the objects to be coupled. It has been discovered that a coupling made of such material can be made to expand spontaneously as it is cooled through the transition temperature into the martensitic phase of the material if stresses are introduced into the material at an earlier stage of the fabrication of the coupling. If the coupling is then heated so that it again passes through its transition temperature into the austenitic phase, the coupling will contract to a size substantially no greater than its size prior to this temporary expansion. Consequently, such a coupling can be freely positioned over or removed from objects when it is cooled to below the martensitic transition temperature of the material from which it is made and firmly secured to such objects when again heated to above the transition temperature of the material. It has also been discovered that the ability of the coupling to withstand very high pressure without pulling apart or leaking can be greatly enhanced by the location of teeth within the coupling. The strength of the joint or coupling can be further increased by taking advantage of other characteristics of such material and by properly selecting the manner in which the couplings are fabricated and stored.

BRIEF DESCRIPTION OF THE DRAWINGS

FIG. 1 is a cross-sectional view of a first embodiment of a coupling according to the present invention;

FIG. 2 is an end view of the coupling of FIG. 1;

FIG. 3 is a cross-sectional view of the coupling of FIG. 1 positioned over a pair of pipes;

FIG. 4 is a cross-sectional view of the coupling of FIG. 1 after installation on the pipes;

FIG. 5 is a cross-sectional view of a second embodiment of a coupling according to the present invention;

FIG. 6 is a cross-sectional view of the coupling of FIG. 5 positioned over a pair of pipes;

FIG. 7 is a cross-sectional view of the coupling of FIG. 5 after installation on the pipes; and FIG. 8 is a cross-sectional view of a length of pipe with a band of metal shrunk about its exterior.

DESCRIPTION OF THE INVENTION

The foregoing summary is only a brief description of the present invention. In order to understand the invention more completely, certain properties of the metals from which the coupling of the present invention may be made must be discussed in more detail. It is to be understood that the following discussion, and indeed all the theories and principles expresssed herein, are given to further an understanding of the invention, but, while they are the best presently available to the inventors, are not to be considered in any manner restrictive of the invention.

As used herein, the term "heat recoverable material" means a material which has been deformed from an original, heat-stable configuration to a different configuration in which it will remain until raised above a certain temperature when it will return, or attempt to return, to its heat-stable configuration. This different configuration, whether maintained due to the material being cooled to below the certain temperature, or because of an external restraining force exerted on the material while it is above the certain temperature which prevents it from returning to the heat stable configuration, will be referred to herein as the "heat-unstable configuration". The deformation used to place the material in the heat-unstable configuration will be referred to herein as "thermally recoverable plastic deformation". A material which may be so deformed and recovered is referred to herein as a "material capable of having the property of heat recoverability imparted thereto". The certain temperature mentioned above is referred to herein as the "transition temperature." It should be understood that the transition temperature may be a temperature range, and a hysteresis usually occurs which causes the precise temperature at which a transition takes place to depend on whether the temperarture is rising or falling. Further, the transition temperature is a function of the stress applied to the material, the temperature rising with increasing stress. The terms "heat recovery" and "recovery" are used interchangeably herein to refer to the change in configuration of such a material which occurs at the transition temperature.

Examples of metallic materials which are capable of having the property of heat recoverability imparted thereto are the alloys disclosed in U.S. Pat. Nos. 3,012,882 and 3,174,851 and Belgian Pat. No. 703,649, the disclosures of which are incorporated by reference herein to illuminate the background of the present invention. As made clear in these patents, these alloys undergo a transition at a certain temperature which in the case of the gold-cadmium and silver-gold-cadmium alloys described in U.S. Pat. No. 3,012,882 is simply referred to as a phase change. The other patents describe the transition which takes place in the disclosed alloys as one between austenitic (or high temperature) and martensitic (low temperature) forms of the material.

It is well known that metallic materials have an elastic limit, that is, they can be deformed up to a certain point and when the deforming force is removed will return to their original shape. If a normal metallic material is exposed to a deforming force great enough to exceed its elastic limit, some permanent deformation will take place. In order to distinguish this deformation from that previously described, this deformation will be referred to herein as "non-thermally recoverable plastic deformation." Also, this deformation will take place in materials suitable for use in the present invention if the stresses imposed on the material are not of the character which impart only thermally recoverable plastic deformation to the material. For example, a force can be imposed on the material that exceeds that sufficient to impart the maximum thermally recoverable plastic deformation to the material while it is maintained below its transition temperature and in the martensitic phase. Alternatively, the material can be worked in the austenitic phase, above the transition temperature so that only non-thermally recoverable plastic deformation take place. In either case, the non-thermally recoverably plastic deformation sets up internal stresses in the material. It has been discovered that these stresses can be relieved when a heat-recoverable metallic material is passed downwardly through its transition temperature. It has further been discovered that this stress relief will result in a change of shape of the material. This shape change at the transition temperature will be referred to herein as "spontaneous expansion" for the purpose of simplicity in explanation; it should be understood however that this change in shape can take other forms depending on the initial deformation. The material will remain in the changed state until it is passed upwardly through the transition temperature.

With the foregoing principles and definitions in mind, a simple but typical coupling according to the present invention and the manner in which it is formed and used will now be described. A tube of a metallic material of the type referred to is expanded radially, i.e., distorted at a temperature below the transition temperature of the material, for example, by forcing through the tube a mandrel having a diameter greater than the original internal diameter of the tube. The degree of expansion preferably is great enough so that both thermally recoverable and non-thermally recoverable plastic deformation take place, The tube is then raised above the transition temperature while being maintained in the expanded position by the mandrel or a keeper of approximately similar diameter. The tube will fit tightly on the mandrel or keeper because it will attempt to heat recover to its original configuration.

At the appropriate time, the tube is again cooled to below its transition temperature. When the tube reaches the transition temperature, spontaneous expansion occurs, increasing the internal diameter of the tube and resulting in the tube being easily removable from the keeper. As long as the temperature of the tube is kept below the transition temperature, it will retain this internal diameter, enabling the coupling to be placed in position over the pipes or other objects to be connected. These objects, of course, must have an outside diameter smaller than the expanded diameter of the coupling, and at least as large as the internal diameter of the coupling in its heat stable configuration.

After the coupling has been installed on the objects to be connected, the joint is caused to be heated to above the transition temperature of the material of the coupling. The coupling being heat recoverable, recovers or shrinks toward its heat-stable configuration until it engages the objects and is restrained from further recovery. Since the recovery forces are substantial, the coupling makes an extremely tight fit on the object so long as the joint is maintained above the transition temperature. The restraining action of the objects on the coupling re-introduces non-thermally recoverable plastic deformation stresses into the material of the coupling. Consequently, when the coupling is again cooled to its transition temperature, these stresses will be released in the form of spontaneous expansion and the coupling may again be removed from the objects.

As discussed above, in order to impart the property of spontaneous expansion on reduction of temperature through the transition temperature to heat recoverable metallic material, it is generally necessary for it to be deformed in such a way as to give it some non-thermally recoverable plastic deformation. This may not be necessary if the material already has sufficient internal stresses, as may be the case, for example, in materials which have been formed or otherwise worked and not subsequently annealed, provided, of course, that these forces are exerted in the proper direction. Since the percentage deformation at which thermally recoverable plastic deformation ends and non-thermally recoverable plastic deformation begins varies with the heat recoverable material, it is not possible to give an absolute numerical value for the percentage of total plastic deformation required when the deformation takes place below the transition temperaure. However, for materials consisting predominantly of titanium and nickel, a range of about 7 to 9 percent is typical.

It will be apparent to those skilled in the art that it is a matter of routine experiment to determine from the stress-strain curve of a given material the degree of deformation required to provide the material with non-thermally recoverable plastic deformation. For the purpose of the present invention, only a small level, for example about 2%, of non-thermally recoverable plastic deformation is necessary. Below this level, the amount of spontaneous expansion available at the transition temperature is likely to be insufficient to allow the article readily to be removed from its mandrel.

It is to be understood that the alloys disclosed in the references cited above are only exemplary of the metals which may be used in the process of the present invention, and it is to be understood that the scope of the invention is in no way limited to these materials, nor to the materials specifically set forth as examples in the specification. Each of the materials tested has been found capable of being subjected to non-thermally recoverable plastic deformation sufficient to give useful spontaneous expansion to an article constructed in accordance with the invention.

A preferred article constructed in accordance with the invention is a fitting for use in hydraulic systems, especially for aircraft. Aircraft hydraulic systems, as stated above, contain many lengths of pipe which have to be joined by couplings, tees, crossovers and the like and which terminate in a variety of pumps, valves, meters and operational equipment. At each such junction or termination, a fitting of some type will be required. For simplicity of description, a coupling for a simple butt joint between two pipes of substantially identical diameter will be described in more detail hereinafter, but it will be understood that the present invention provides fittings of configurations other than such a coupling.

Present aircraft require hydraulic equipment to be capable of operating at temperature within the range of from about $-55°$ C., to $125°$ C., but it is desirable to have equipment capable of operating between about $-75°$ C. and $250°$ C. with some special equipment, for example in engine areas, capable of withstanding over $500°$ C. For reasons which will be apparent, a heat recoverable metallic material for use in hydraulic line fittings should preferably therefore have a transition temperature somewhat below $-75°$ C.

Liquid nitrogen, boiling at $-196°$ C., offers a convenient means of reducing temperatures of articles to its boiling point. Temperatures lower than $-196°$ C. can, of course, be obtained by other liquified gases, but nitrogen offers the advantages of ready availability and comparative safety.

Preferred metals for use in this aspect of the present invention are, therefore, those which have a transition temperature within the range of about $-196°$ C. and $-75°$ C. In addition to satisfying the environmental requirements, the use of such a metal at normal temperatures assures that it is in its austenitic form where it has greater strength.

Among metals suitable for the present invention there may be mentioned, by way of example, the following alloys, in which the percentages are atomic percentages and are approximate;

| No. 1 Titanium 50 | Nickel 47 Iron | 3 |
| No. 2 Titanium 49.25 to 49.00 | Nickel 50 Aluminum | 0.75 to 1.00 |
| No. 3 Titanium 48.5 | Nickel 51.5 | |
| No. 4 Titanium 50 | Nickel 48 Manganese | 2 |

These alloys each have a transition temperature within the desired range. It will be appreciated that the alloys may contain incidental impurities provided that the impurities do not adversely affect the mechanical and physical properties of the material nor alter the transition temperature to such an extent that the article is rendered unsuitable for its intended purpose. The compositions of these alloys per se do not form part of the present invention. A more complete disclosure of the nature of alloy No. 1 can be found in an application filed the same day as the present application by John D. Harrison, Jei Y. Choi and Peter R. Marchant entitled "Heat Recoverable Alloy", Ser. No. 52,112 filed July 2, 1970 (now U.S. Pat. No. 3,753,700) and assigned to the assignee of the present application.

These titanium-nickel alloys (whether for a hydraulic coupling or for any other application of the invention) may be manufactured and formed by any of the usual methods of making titanium alloys, either from their constituent elements or from alloys or compounds of the constituents in other proportions. Among such methods there may be mentioned by way of example consumable and non-consumable arc melting, vacuum induction melting in graphite crucibles, electron beam melting, powder metallurigical methods and floating zone melting.

The resulting alloy can readily be formed into suitable blanks for final manufacture of the articles by, for example, hot forming, swaging, hot extrusion, hot rod rolling or hot forging, or, to a lesser extent, by cold forming. Whatever method of shaping is adopted, the alloys are desirably annealed to ensure reproducibility of properties in the resulting articles.

Referring to the drawings and particularly FIG. 1, a coupling of the present invention is indicated generally by the reference numeral 10. The outside surface of the coupling 10 comprises a central portion 12 of constant cross-section and two end portions 14 and 16 each tapering toward their respective ends 18, 20 of the coupling.

The inner surface, formed by the bore 22, comprises a central portion 24 of constant cross-section and flared end portions 26 and 28. Between each end portion and the central portion 24 are two circumferential teeth (30 and 32 between the end portion 26 and the central portion 24; 34 and 36 between the end portion 28 and the central portion 24). The teeth are each generally of saw tooth shape, the radial portion of each saw tooth facing the center of the coupling.

It has been discovered that the pull-out strength of such a coupling is substantially increased by proper spacing of the teeth along the interior wall of the coupling. The pull-out strength of the coupling is further enhanced when the tubing material to be joined is itself deformed by recovery of the coupling. FIGS. 5 through 8 illustrate such a coupling. In FIG. 5, a coupling 50 fabricated from a heat recoverable metal has an outer wall having a cylindrical portion 51 and tapering portions 52 and 53 at each end. The interior wall has a series of spaced teeth 54–56 and 58–60 and a recess 57.

FIG. 6 shows the coupling 50 in an expanded (cooled) condition with tubes 61 and 62 inserted therein. The space between tubes 61 and 62 is centrally positioned in the recess 57.

FIG. 7 shows the coupling after recovery on tubes 61 and 62. As can be seen, the tubes 61 and 62 are partially deformed by the teeth of the coupling. It should be understood that the illustrated deformation is exaggerated for purposes of clarity; in normal situations the deformation being considerably less than that illustrated. Typical deformation is, however, sufficient to significantly increase the pull-out strength of the coupling.

The optimum spacing "a" and minimum depth "b" of the teeth depends on the properties of tubes 61 and 62. One method of determining the dimensions "a" and "b" is shown in FIG. 8. A ring 63 of the heat recoverable metal from which the coupling 50 is fabricated, and having the same recovered diameter, is shrunk around a length of tubing 64. Tubing 64 is fabricated of the same material as the tubing to be joined. The recovery of ring 64 deforms the tubing, causing a radially outward movement of some of its material, the maximum outward deformation being indicated by "b" in FIG. 8. The axial extent of the radial deformation is indicated by "a" in FIG. 8 which thus is the distance from the point where radial deformation begins to the point where it ceases. This distance "a" is then used as the spacing between adjacent teeth as shown in FIG. 6. The minimum depth "b" of the teeth in FIG. 6 is preferably selected to be equal to or greater than the dimension "b" of FIG. 8.

The minimum coupling wall thickness "c" along the cylindrical portion 51 of the coupling that is, the thickness or the wall in the area of the recess 57, is determined by the maximum expected pressure in the hydraulic line and by the relative elasticity of the material of tubings 61 and 62 and that of the coupling. The thickness "c" is preferably sufficient to withstand the maximum hydraulic pressure and to resist bulging of the coupling, and to withstand metal fatigue under operating conditions. Further, the thickness "c" is preferably such that the coupling 50 will tend to expand elastically under pressure less than tubings 61 and 62. Otherwise, when the joint is subjected to high pressure, the greater expansion of the coupling would cause leakage. By so designing the minimum wall thickness, coupling weight may be minimized.

The inside diameter of recess 57 is preferably sufficiently great so that the tubing ends do not touch the coupling at any point, particularly when subjected to vibrations as fretting corrosion of the coupling by the tubing might occur resulting in a weakening of the coupling and ultimately its failure. The tapered end portions 52 and 53 of the coupling comprise another important feature of this invention. As will be noted, these end portions 52 and 53, each have converging inner and outer surfaces 65 and 66. The purpose of providing the taper to the inner surface 65 is to reduce the radial force exerted on the tubing at the ends of the coupling upon its recovery. A high radial force on the tubing at the ends of the coupling would tend to weaken the tubing at those points, particularly if the tubing was subjected to bending or vibrations. A zero radial force would be theoretically ideal. However, it has been found that if the coupling ends are not tight around the tubing a rubbing can occur with vibration and this can lead to fretting corrosion and failure. Thus, the inside diameter at the coupling ends should advantageously be such that when the coupling shrinks about the tubing there will be a slight positive pressure on the tubing but the pressure will be at a minimum. The provision of the taper to the outer surfaces 66 further helps keep the pressure at a minimum because a thinner metal cross-section will exert less force than a thicker section. The tapered outer surfaces imparts flexibility to the coupling which tends to protect the tubing from the effects of bending or vibrations. This is particularly true in the case of titanium tubing. Advantageously, this reduction in outside diameter should be a substantial reduction. It has been found that an edge thickness on the order of one-forth or one-fifth of the minimum wall thickness "c" of the coupling at the recess 57 is particularly effective.

It has been found tha the teeth 54–56, 58–60 are most effective when their biting edges approximate a right angle, preferably as close to radial as possible. These circumferential teeth need not be formed by tapered sections, however, and could be formed merely by forming a series of V-shaped or "⊔" shaped ridges or the like in the interior of coupling. A coupling according to the present invention was fabricated as follows.

Equal width and length strips were cut from sheet stock of nickel (International Nickel 270), titanium (Titanium Metals Corporation 35A) and iron (99.9% pure). The strips were cleaned to remove any dirt or grease, weighed and assembled in bundles such that the elements were in the ratio of alloy No. 1 at each cross section through the longitudinal axis of the bundle. The bundle was then hung in the chamber of a Lepel HCP-F floating zone unit. The chamber was evacuated, then filled with high purity argon to a pressure of 1 atmosphere; this procedure was repeated twice; after the third filling a pressure of +3 p.s.i. gauge was established and maintained during the melting to minimize air influx.

The lower end of the sample was heated by a single turn induction coil attached to the secondary winding of a 12:1 load matching step down transformer, the primary being powered by a Lepel high frequency induction heating unit (Model T-10-3-DF-3-H) operating in the kilohertz range. Rapid melting resulted from the combination of induction heating and the heat of formation of the intermetallic compound TiNi 0.94 Fe 0.06. The falling droplets of alloy were collected in a cold copper mold, the bundle being fed into the induction coil until it had all been melted and collected in the mold. After cooling, the copper mold and drip-cast ingot were removed from the chamber, and the mold was stripped.

The dripped ingot, which was a semi-compact cylinder, was returned to the chamber and an argon atmosphere established as before. A molten zone was passed along the ingot from bottom to top at a rate of about 0.5 cm/minute using the floating zone technique to avoid possible contamination by the crucible. The product was a homogeneous, void-free bar of alloy about 2 cm. diameter, 12 cm. long.

A coupling such as that shown in FIG. 1 was constucted as follows:

An axial hole was drilled in the end of a bar of alloy formed as described above, the depth of the hole being equal to the final length of the coupling. The outside surface of the bar was then turned to the diameter of the central portion 12, and the blank cut off the end of the bar.

The tapered end portion 26 was then formed on a lathe, using a lathe taper attachment. The attachment was then reset and a radial cut made, to form the outer tooth 30. A second taper was then started, and a second radial cut made, to form the inner tooth 32. The cut was then continued parallel to the axis to form half the central portion 24. The coupling was then turned round and the tapered portion 28, teeth 36 and 34 formed and the remaining half of the central portion bored to size. The tapered portions 14 and 16 on the outer surface were then formed, the surface polished and de-burred.

The machined coupling was then heated in an inert atmosphere at 950° C. for 30 minutes, cooled rapidly to 270° C. to 300° C. and maintained at that temperature for two hours, still in an inert atmosphere. The coupling could alternatively be treated initially for a longer period at a somewhat lower temperature, e.g., 2 hours at 850° C., and the second heating period can be at any temperature between 250° C. and 300° C. This treatment serves to anneal the coupling and remove the internal stresses therefrom.

The coupling was then immersed in liquid nitrogen and a tapered mandrel, previously cooled to liquid nitrogen temperature, forced through the bore of the coupling to expand it by 8.3%, enough to provide both thermally recoverable and non-thermally recoverable plastic deformation of the coupling. The mandrel was removed, and a previously cooled rod or keeper having a diameter slightly less than the maximum diameter of the mandrel inserted in the bore. The coupling and its keeper were then allowed to return to room temperature, the coupling tightening onto the keeper as its temperature rose through the transition temperature as a result of its property of heat recoverability. Four hours later, the coupling and keeper were again cooled in liquid nitrogen. The ends of two stainless steel hydraulic pipes were cleaned and prepared for connection, a mark on each pipe indicating the correct extent of insertion into the coupling. The coupling was then removed from the liquid nitrogen, the keeper being readily removed from its bore. As shown in FIG. 3, the ends of the pipes 40 and 42 were then inserted into the coupling up to the indicated marks, and the assembly was left to warm up to room temperature. As shown in FIG. 4, a firm junction between the pipe ends was obtained, the teeth of the coupling biting into the pipes 40 and 42 and they become slightly deformed in the process. The extent of the deformation depends on the relative hardness of the coupling when compared to the pipes to be joined. It is to be understood that the showing of FIG. 4 is for the purpose of clarity and is not necessarily intended to be to scale.

By a procedure similar to that described above, a coupling of Alloy No. 3 was manufactured and applied to form a butt joint between two stainless steel hydraulic pipes of outside diameter 0.25 inch (0.635 cm.). The pipes were filled with petroleum base hydraulic fluid (conforming to MIL-H-5606B), and subjected to the following tests.

1. The pressure in the system was maintained at 6,000 p.s.i. ($4.14 \times 10^8$ dyne/cm$^2$) for 5 minutes, then at 12,000 p.s.i. ($8.28 \times 10^8$ dyne/cm$^2$) for 5 minutes. No leak was observed at the end of either period.

2. The coupling was then subjected to the rotating beam test (conforming to MIL-F-18280B) with the hydraulic fluid at 3,000 p.s.i. ($2.07 \times 10^8$ dyne/cm$^2$), being cycles at approximately 2,000 rpm for $26.2 \times 10^6$ cycles. No leaks were observed, nor was any damage to the coupling visible.

3. Test No. 1 was then repeated. No leaks were observed.

4. The system was tested in a mass spectrometer, with helium at atmosphere pressure outside the coupling, the inside of the system being evacuated. No helium was observed inside the system, the sensitivity of the spectrometer was $9.5 \times 10^{-11}$ std.atm.cc/sec.

Couplings of Alloy No. 3 were applied to parts of hydraulic pipes as described above. The following tests were carried out.

5. One system was filled with hydraulic fluid at a pressure of 6,000 p.s.i. ($4.14 \times 10^8$ dyne/cm$^2$). The temperature of the system was cycled between $-55°$ C. and $+175°$ C. 29 times, each cycle occupying about 2 hours. No leak was observed.

6. The other systems were tested to destruction by increasing the internal pressure of hydraulic fluid. In each case, the stainless steel tubing burst before any leak took place at the coupling, the pressures varying between 15,000 and 25,000 p.s.i. ($1.04 \times 10^9$ and $1.72 \times 10^9$ dyne/cm$^2$).

The tests described in this and the preceding examples show that the invention provides a reliable hydraulic coupling which can be stored and transported at normal temperatures and quickly and easily installed at conveniently obtainable low temperatures.

In the discussion to this point, the operation of the coupling of the present invention has been discussed primarily in terms of the spontaneous expansion and heat recovery properties of the material used. However, there are other factors which should be considered, the use of which can substantially contribute to the quality and utility of the coupling. As pointed out previously, the heat recovery of the coupling on an object (whether a mandrel, keeper or pipe) causes a non-thermally recoverable plastic deformation to occur to the material of the coupling. The amount of this non-thermally recoverable plastic deformation is, to some extent, in effect subtracted from the thermally recoverable plastic deformation built into the coupling. If, for example, the keeper on which the coupling is stored and transported has a diameter equal to the mandrel which originally expanded in part, then the part may be permanently distorted so that its heat stable configuration is somewhat greater than the original configuration. If this is the case, the diameter of the objects on which the coupling is to be installed must be somewhat larger than its new heat stable configuration. This, of course, limits the size range of the pipes with which the coupling may be used. It is also possible to store the couplings without the use of a keeper, relying on the spontaneous expansion to obtain sufficient clearance to install the coupling on the tubing to be joined.

The elasticity of most, if not all, of the metallic materials useful in the present invention compensates to some degree for the problem just discussed, i.e., that of non-thermally recoverable plastic deformation upon heat recovery on a restraining object. Because of this elasticity, the new heat stable configuration after heat recovery on a restraining object will not be precisely that defined by the restraining object but rather a configuration falling between the original heat stable configuration and that defined by the restraining object. In other words, before non-thermally recoverable plastic deformation occurs, an elastic deformation occurs which will impart an elastic memory to the article which will be released when the restraining force is removed. In the titanium-nickel alloys discussed above, the elasticity is about 2% so that the objects to be connected can have diameters that much smaller than the diameter of the keeper.

By properly selecting the material of which the keeper is made, or its configuration, the total recovery of the coupling can be made to approach that which was originally built into it upon expansion. As pointed out above, it is generally desired that recovery result in some non-thermally recoverable plastic deformation so that stresses are introduced into the material to cause spontaneous expansion when desired. The distance through which the coupling can be recovered can be increased, for example, by constructing the keeper of a material having substantial elasticity. In such a case, the elastic limit of the coupling must be exceeded before non-thermally recoverable plastic deformation takes place in the coupling. For this purpose, the keeper could be constructed of the same material as is the coupling, or of another material having substantial elasticity, for example, beryllium copper.

Alternatively, the keeper may be constructed of a material exhibiting a negative coefficient of thermal expansion. In this case, the keeper's diameter would contract as it was raised in temperature, allowing the coupling to heat recover to a greater degree than if the diameter of the keeper would remain constant. To the same result, the keeper could be constructed in the form of a cylindrical spring such as a conventional roll pin that could be collapsed by recovery of the coupling on it. Other alternative methods of providing the keeper with sufficient elasticity for the purpose described will be apparent to those skilled in the art and are intended to be included within the scope of the invention. It should be understood, however, that in the simplest case, the coupling of the present invention only requires that the material be heat recoverable and stressed in some fashion to provide it with the property of spontaneous expansion.

From the foregoing description it can be seen that the present invention provides a heat recoverable metallic article useful for many purposes, such as making a leak-proof joint between a pair of pipes. Such couplings could also be used to join cables or other members or to repair sections of pipes. The couplings may be stored and transported at normal temperatures and are quick and easy to install or replace, yet can withstand extreme temperature cycling. Although the coupling has been discussed herein as being tubular, it should be understood that the coupling need not be regular or constant in cross-section. While certain embodiments of the invention are described, the invention may be embodied in other specific forms not departing from the spirit or central characteristics thereof. The present embodiments and examples are therefore to be considered in all respects as illustrative and not restrictive.

What is claimed is:

1. An article comprising a heat recoverable metallic material above its transition temperature, the article having been distorted a sufficient amount that both thermally recoverable and non-thermally recoverable plastic deformation took place, the article being maintained in a heat-unstable configuration by a restraining member in engagement with the article and exerting a restraining force in the direction opposite that of heat recovery of the material, wherein when the temperature of the article is reduced to below the transition temperature of the material, the article will expand in the direction of the restraining force an amount sufficient that the restraining member exerts no restraining force on the article, said expansion including spontaneous expansion occurring even when the restraining member exerts no force on the article.

2. The article of claim 1 wherein said metallic material has a transition temperature between about $-196°$ C. and about $+75°$ C.

3. The article of claim 1 wherein said metallic material is an alloy consisting essentially of about 50 atomic percent titanium, about 47 atomic percent nickel and about 3 atomic percent iron.

4. The arcticle of claim 1 wherein said metallic material is an alloy consisting essentially of about 50 atomic percent nickel, about 0.75 atomic percent to about 1.0 atomic percent aluminum and correspondingly about 49.25 atomic percent to about 49 atomic percent titanium.

5. The article of claim 1 wherein said metallic material is an alloy consisting essentially of about 51.5 atomic percent nickel and about 48.5 atomic percent titanium.

6. The article of claim 1 wherein said metallic material is an alloy consisting essentially of about 2 atomic percent manganese, about 48 percent nickel and about 50 atomic percent titanium.

7. The article of claim 1 wherein the article has been distorted at a temperature below its transition temperature.

8. The article of claim 1 wherein the article has been distorted at a temperature above its transition temperature.

* * * * *